No. 862,063. PATENTED JULY 30, 1907.
J. F. DE JARNETTE.
VEHICLE WHEEL.
APPLICATION FILED OCT. 1, 1906.
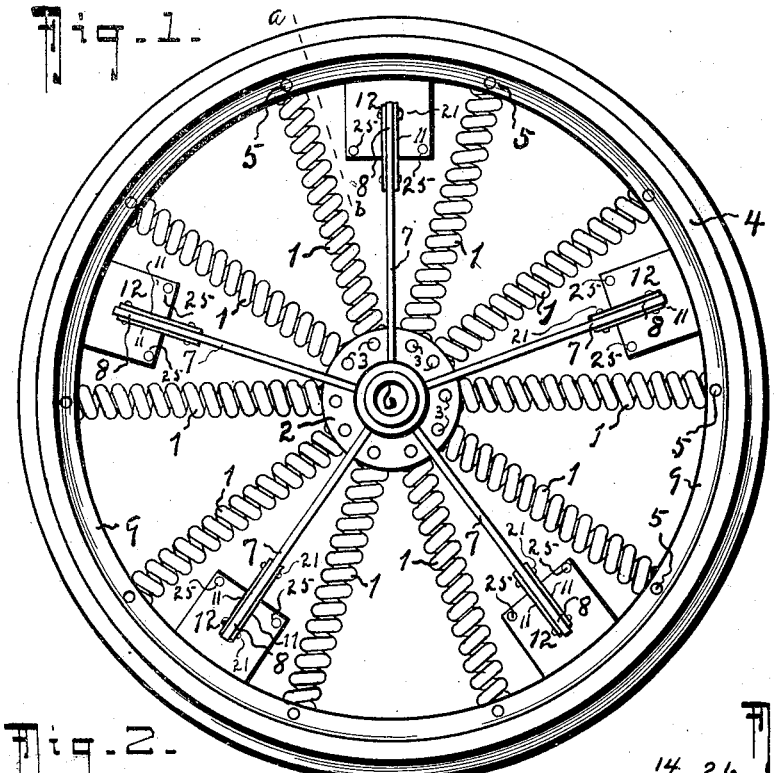
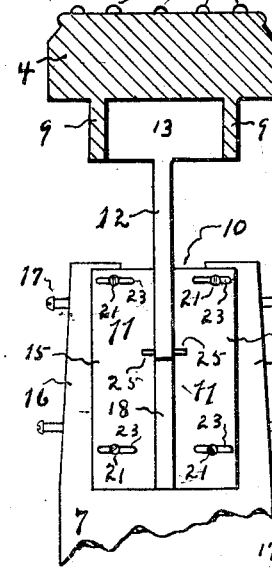
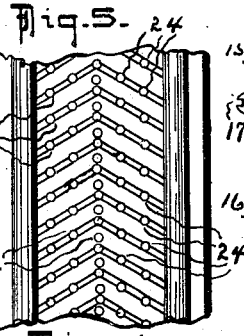
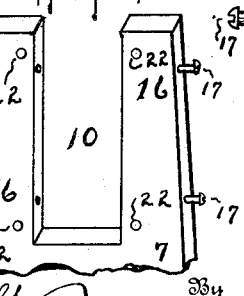
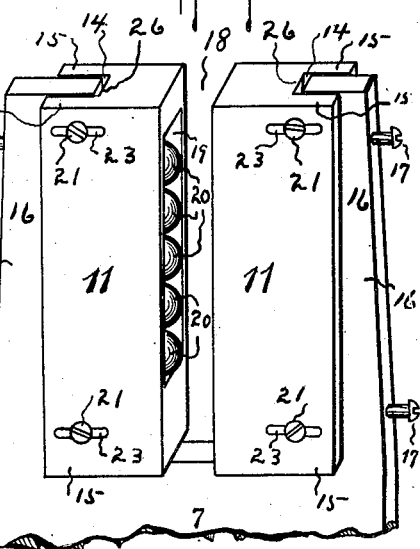

UNITED STATES PATENT OFFICE.

JAMES F. DE JARNETTE, OF OMAHA, NEBRASKA, ASSIGNOR TO EBY MANUFACTURING COMPANY, OF OMAHA, NEBRASKA.

VEHICLE-WHEEL.

No. 862,063.  Specification of Letters Patent.  Patented July 30, 1907.

Application filed October 1, 1906. Serial No. 336,818.

*To all whom it may concern:*

Be it known that JAMES F. DE JARNETTE, a citizen of the United States, residing at Omaha, in the county of Douglas and State of Nebraska, has invented certain new and useful Improvements in Vehicle-Wheels, of which the following is a specification.

This invention relates to improvements in vehicle wheels, and more particularly automobile wheels.

The objects of the invention include the provision of resilient, non-vibrating, means for supporting the weight of the vehicle while passing or driving over rough surfaces, also means for sustaining the hub in alinement with the opposite sides of the tire and for preventing lateral vibration.
The invention contemplates the furnishing of means for dispensing with an inner rim heretofore used, thereby reducing cost, and supplying a stronger and more effective construction.

The novel features of the invention are fully described herein, pointed out by the claims, and illustrated by the drawings, wherein,—

Figure 1 represents a vertical side view of the invention; and in this instance both sides of the invention present the same construction. Fig. 2 is a vertical end view showing a guide and part of a recessed spoke, the tire being sectioned, as on the line $ab$ of Fig. 1. Fig. 3 is a perspective view, being a detail of Figs. 1 and 2, to illustrate mounting of friction contact members or housing-boxes, and adjustable means. Fig. 4 is a detail of Fig. 3. Fig. 5 is a plan view of a rugose tire periphery.

I mount one end of the radially disposed resilient spokes 1 pivotally upon the hub 2, as at 3, the opposite ends of said spokes being pivotally mounted upon the tire 4, as shown at 5; the aperture 6 of the hub is adapted to accommodate therein the axle of a vehicle. The spokes 1 are constructed so that their tension is comparatively equal. Rigidly upon hub 2 I mount the radially extending non-resilient spokes 7 in a manner so that the outer ends 8 terminate adjacent to the inner rim 9 of the tire 4. The rigidly mounted spokes 7 are preferably constructed as broad and comparatively thin plates, their broad faces being presented transverse to the planes of the wheel, and the outer end 8 of each of these is incised to provide for the angularly formed recess 10 (Fig. 4) in which are seated a pair of the housing boxes 11.

Between the inner rims 9 of the tire 4 are rigidly mounted the heads 13 of guides 12. These guides are similar as compared with each other and each consists of a broad plate, the wide surface of which is coincident with the plane of the wheel. Each guide 12 is preferably constructed integral with the head 13, this head having a length in extent equal to the entire width of plate 12, so that the guides may be rigidly secured upon the tire.

I construct housing-boxes having lengthwise extending slots 14, the walls 15 of which are adapted to overlap the arms 16 of spokes 7. Arms 16 are provided with set-screws 17 which pass therethrough and make contact with a wall 26 of the housing box formed at the termination of slot 14, and by adjusting these screws the space 18 (Fig. 3) between the housing boxes may be decreased, as is obvious. The face of each housing box 11 is chamfered on the face adjacent to the space 18 to form a depressed chamber 19, within which friction balls 20 are confined. The space 18, as thus descibed operates as a lengthwise extending slot within spoke 7 adapted to receive therein the guide 12, the balls 20 being mounted in a manner so that their peripheries occupy a plane in advance of their adjacent confining walls, and therefore make contact with the surface of the guides.

The normal position of spokes 7 with reference to guides 12 is such that guides 12 occupy about half of the longitudinal extent of slot 18, (Fig. 2.) and, in operation, when the wheel passes over an obstruction the hub is pressed downward somewhat toward the lower part of the tire, but during this movement of the entire inner parts of the wheel, the rigidly mounted spokes 7 have a smooth sliding movement upon guides 12 and a lateral movement of the inner portion of the wheel is avoided. The parts thus combined are few and easily provided, and the transverse presentation of plates shown in spokes 7 and guide 12, it is considered, affords a strong construction to resist a lateral strain. Any longitudinal movement of housing-boxes 11 upon arms 16 is prevented by means of set-screws 21 which pass through each wall 15 as well as apertures 22 of these parts, and transversely formed slots 23 are provided in the overlapping walls 15 to permit adjustment of the housing-boxes by operation of set-screws 17.

The tire 4 is preferably constructed of metal, and nodules 24 are formed upon the periphery of the tire with a view of furnishing an increased frictional contact of said tire upon the pavement or surface upon which the tire makes contact.

It is not considered that friction-balls are necessary to the operation of the invention, and the housing-boxes 11 may be dispensed with, in which case arms 16 should be constructed closely adjacent to guides 12, and I do not limit the invention to the actual construction shown. The housing-boxes and balls are used to make an exact adjustment and prevent any rattling noise, from the contacting parts, and it is considered the best construction.

In the use of my invention the sudden stop or start of the vehicle causes a partial rotation of the inner parts of the wheel, at which time the spoke 7 has a limited travel or slide upon the broad face of guide 12, and lugs 25 (Figs. 1, 2.) are therefore rigidly and transversely secured upon the outer faces of each guide 12 to arrest any undue rotation of this character.

As thus described the parts and their operation will be fully understood without further explanation.

What I claim as my invention is,—

1. A vehicle wheel comprising a tire; a hub; resiliently mounted spokes extending radially from said hub to said tire; a series of inwardly extending guides mounted upon said tire; a series of rigidly-mounted radially-extending spokes upon said hub and having outer terminating ends; slot-forming housing-boxes mounted upon said terminating ends of said rigidly mounted spokes, said housing-boxes forming a lengthwise-extending slot therein; said series of inwardly extending guides adapted to be seated within said series of lengthwise-extending slots formed by said housing-boxes.

2. A vehicle wheel comprising a tire; a hub; resiliently mounted spokes; rigidly mounted spokes; a series of guides; said resiliently mounted spokes being radially extended from the hub to the tire; said resiliently mounted spokes having pivotal bearings upon said hub and said tire; said rigidly mounted spokes extending radially from said hub and having terminating outer ends; said series of guides being rigidly mounted upon and extending inwardly from said tire; slot-forming housing-boxes mounted upon said terminating outer ends of said rigidly mounted spokes, said housing-boxes forming a lengthwise-extending slot therein; balls seated within said housing-boxes; said series of inwardly extending guides adapted to occupy said series of lengthwise-extending slots formed by said housing-boxes, and make contact with said series of balls.

3. In combination, a vehicle wheel comprising a hub; a tire; a series of guide-plates disposed within the plane of and rigidly secured upon the inner rim of the tire and having adjacently-disposed stop-lugs secured upon their outer faces; a series of resiliently formed spokes pivotally mounted upon and radially extending between said hub and tire; a series of spokes having their inner ends rigidly secured upon and radially extending from the hub, and having parallel arms formed on their outer ends traversing a part of the outer faces of said guide-plates between said adjacently-disposed stop-lugs.

4. In combination, a vehicle wheel as described, comprising a hub; a tire; rigidly-mounted spokes; resiliently-formed spokes having pivotal bearings upon and radially extended between the hub and tire; a series of guide-plates disposed within the plane of and rigidly secured upon the inner rim of the tire, and having adjacently-disposed stop-lugs secured upon their outer faces; said rigidly-mounted spokes having inner ends secured upon and radially extending from the hub and having parallel arms formed on their outer ends; housing-boxes secured between the parallel arms upon the outer ends of said rigidly-mounted spokes and traversing a part of the outer faces of said guide-plates between said adjacently-disposed stop-lugs.

5. In combination, a vehicle wheel as described, comprising a hub; a tire; rigidly-mounted spokes; resiliently-formed spokes having pivotal bearings upon and radially extended between the hub and tire; a series of guide-plates disposed within the plane of and rigidly secured upon the inner rim of the tire, and having adjacently-disposed stop-lugs secured upon their outer faces; said rigidly-mounted spokes having inner ends secured upon and radially extending from the hub and having parallel arms formed on their outer ends; housing-boxes having a lateral-adjustment connection with and seated between the parallel arms upon the outer ends of said rigidly-mounted spokes and traversing a part of the outer faces of said guide-plates between said adjacently-disposed stop-lugs.

In testimony whereof he has affixed his signature in presence of two witnesses.

JAMES F. DE JARNETTE.

Witnesses:
J. J. DE JARNETTE,
HIRAM A. STURGES.